United States Patent
Li et al.

(10) Patent No.: US 7,307,791 B2
(45) Date of Patent: Dec. 11, 2007

(54) HEAD MOUNTED DEVICE

(75) Inventors: Kuo-Yuin Li, Tainan County (TW); Chia-Fen Lin, Tainan County (TW)

(73) Assignee: Himax Technologies Limited, Fonghua Village, Sinshih Township, Tainan County (TW)

( * ) Notice: Subject to any disclaimer, the term of this patent is extended or adjusted under 35 U.S.C. 154(b) by 148 days.

(21) Appl. No.: 10/906,360

(22) Filed: Feb. 16, 2005

(65) Prior Publication Data
US 2006/0072205 A1 Apr. 6, 2006

(30) Foreign Application Priority Data
Sep. 30, 2004 (TW) .............................. 93129648 A

(51) Int. Cl.
*G02B 27/14* (2006.01)
(52) U.S. Cl. ...................... 359/630; 359/649; 359/664; 359/708
(58) Field of Classification Search ................ 359/630, 359/649, 664, 708
See application file for complete search history.

(56) References Cited

U.S. PATENT DOCUMENTS 4,577,935 A * 3/1986 Yamakawa et al. ......... 359/651
6,839,181 B1 * 1/2005 Cobb et al. ................. 359/634

* cited by examiner

*Primary Examiner*—Hung X. Dang
*Assistant Examiner*—Joseph Martinez
(74) *Attorney, Agent, or Firm*—Winston Hsu

(57) ABSTRACT

A head-mounted display (HMD) comprises a frame for hanging on a user's head, and a display device affixed to the frame. The display device comprises alight source, a driving circuit for generating data signals, a polarization beam splitter (PBS), for passing the light emitted from the light source, a liquid crystal on silicon panel (LCOS panel) for reflecting the light from the PBS based on the data signal generated by the driving circuit, and a lens group including a biconvex glass spherical prism and an aspherical plastic prism. The lens group is used for focusing the reflected light from the LCOS panel.

9 Claims, 3 Drawing Sheets

HEAD MOUNTED DEVICE

BACKGROUND OF INVENTION

1. Field of the Invention

The present invention relates to a head mounted device, and more particularly, to a head mounted device utilizing an LCD panel.

2. Description of the Prior Art

A head-mounted display (HMD), a three-dimensional visual optical device, is the first device providing its wearer with an immersive experience. The typical HMD houses two miniature display screens and an optical system that channels the images from the screens to the eyes, thereby presenting a stereo view of a virtual world. Recently, the head mounted display as an input apparatus in response to a user's action is widely utilized in an augmented reality or a virtual reality system. Continuously measuring the position and orientation of the user's head by means of a motion tracker allows an image generating computer to adjust a scene representation to a current view. As a result, the viewer can look around and walk through the surrounding virtual environment. In addition, text and images can be projected on a screen for viewing by the user therefore realizing an augmented reality or a virtual reality environment.

The HMD utilizes a lens group to enlarge an image generated by a small 2-dimension Liquid Crystal Display (LCD). In detail, the image generated by the small liquid crystal display and through the lens group having prisms with decentration free-form surface can be projected on the pupil of the user which sees an enlarged projection image. Such an effect is called a hologram.

The conventional head mounted display fails to gain popularity due to its large volume, heavy weight, and expensive price. Accordingly, smaller volume, less weight, and lower price will be key factors to entice consumers to purchase a new head mounted display.

SUMMARY OF INVENTION

Briefly summarized, the claimed invention provides a head-mounted display (HMD) comprising a frame for hanging on a user's head and a display device affixed to the frame. The display device comprises a light source, a driving circuit for generating data signals, a polarization beam splitter (PBS) for passing the light emitted from the light source, a liquid crystal on silicon panel (LCOS panel) for reflecting the light from the PBS based on the data signal generated by the driving circuit, and a lens group including a biconvex glass spherical prism and an aspherical plastic prism, the lens group being utilized for focusing the reflected light from the LCOS panel.

According to the claimed invention, a display apparatus comprises an image generation device, and a lens group faced against the image generation device consisting of a biconvex spherical prism and an aspherical prism.

According to the claimed invention, a display apparatus comprises an image generation device, a lens group faced against the image generation device including a biconvex spherical prism and an aspherical prism, and a polarization beam splitter (PBS) disposed adjacent to the image generation device and the lens group.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
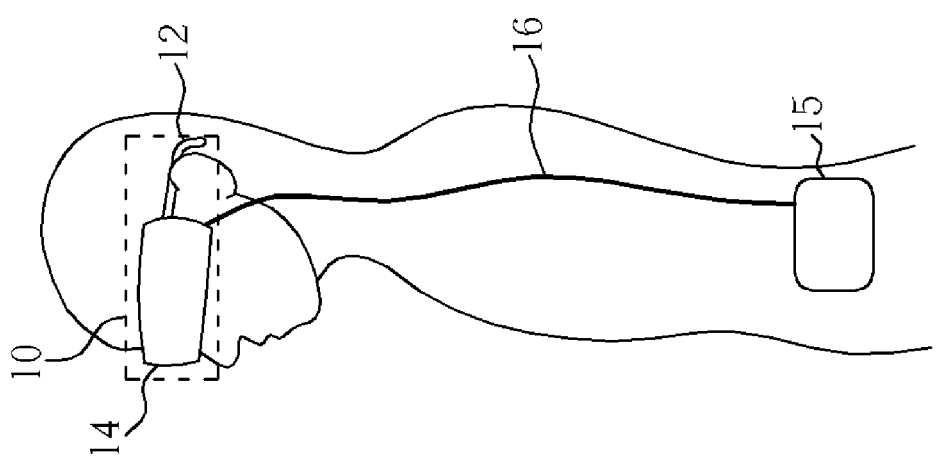
FIG. 1 shows an optical display system having a head-mounted display and a control system according to the present invention.

Please refer to FIG. 1, which shows an optical display system 100 having a head-mounted display 10 and a control system 15 according to the present invention. The user wears the head-mounted display 10 and can see vivid images through the display device 14 affixed to the frame 12 in response to the control system 15. The control system 15 is wirelessly connected or is wired-connected with the head-mounted display 10 by means of a transmission line 16.

Figure 2:
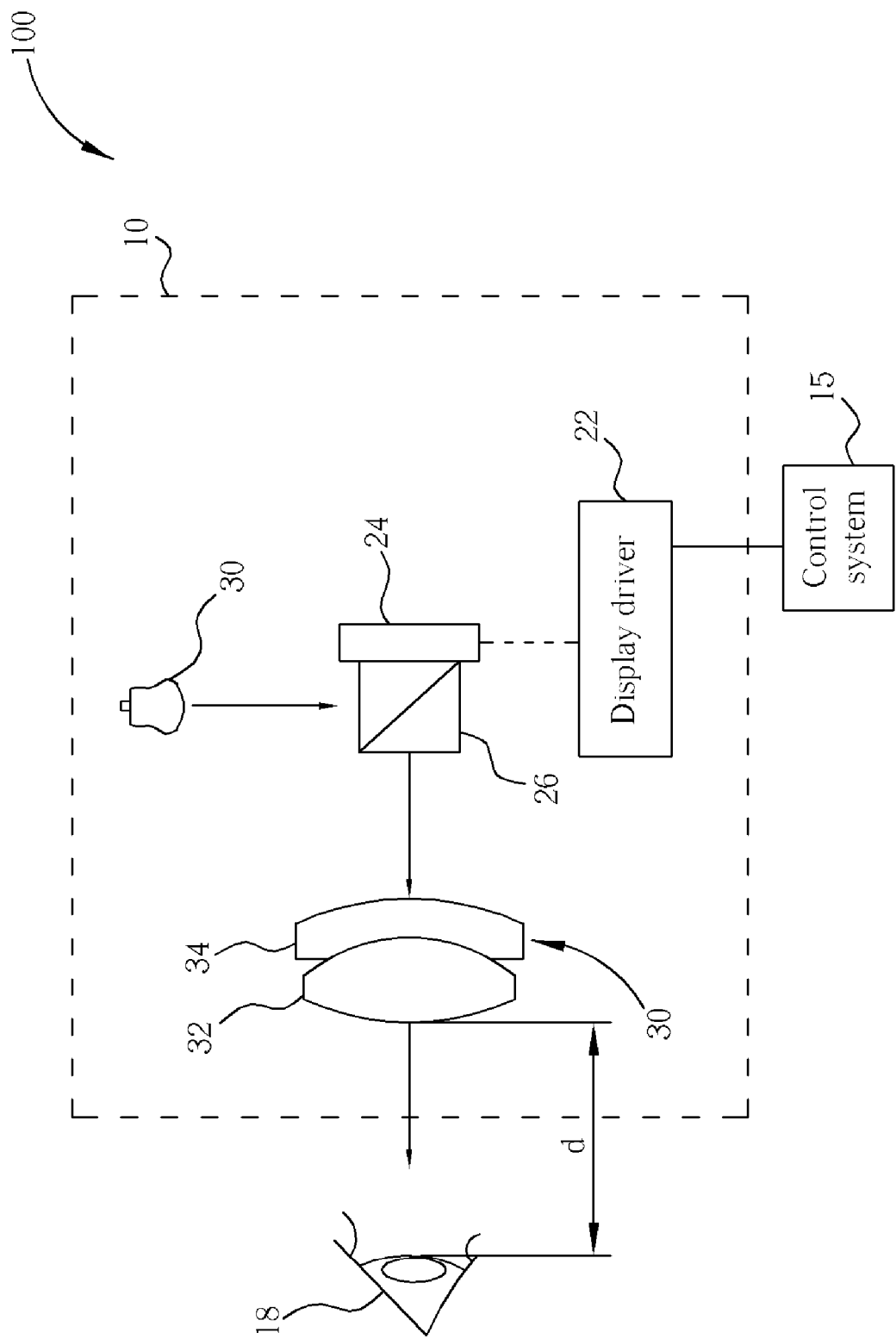
FIG. 2 shows a block diagram of the head mounted display.

Please refer to FIG. 2, which shows a block diagram of the head mounted display 10. The display device 14 contains a lamp 20, a display driver 22, a liquid crystal on silicon (LCOS) panel 24, a polarization beam splitter (PBS) 26, and a lens group 30. Light emitted from the lamp 20 travels through the polarization beam splitter (PBS) 26 and reflects the S-type polarization light to the LCOS panel 24. The LCOS panel 24 modulates the received S-type polarization light into P-type polarization light based on a control signal from the display driver 22, which is controlled by the control system 15. The modulated P-type polarization light passes through the PBS 26 and is directed by the lens group 30 to the pupil of the user; who sees an enlarged image. In other words, the function of the PBS 26 is utilized to allow both the light from the LCOS panel 24 and the ambient light from the user's surrounding environment to enter the user's pupil. As a result, the user with the optical display system 100 can see the real surroundings overlapping with a virtual image which is generated by the LCOS panel 24 based on the signal from the display driver 22 which is controlled by the control system 15. The PBS 26 is disposed adjacent to a lens group 30 and the LCOS panel 24. The lens 30 is used for adjusting the focus length of the incident light reflected from the LCOS panel 24. The proper focus length named as an eye relief d affects the comfortable visible distance. The comfort of the user's view will increase as the eye relief d value (i.e., distance) increases. Moreover, a display apparatus has two display devices 14, each located in front of left and right eyes of the user. The two display devices 14 are utilized to generate a stereo image effect. The LCOS panel 24 comprises a color filter to filter incident light. The color or colors of the color filter may be selected from the group consisting of red color, green color, blue color, or any combination thereof.

The lens group 30 comprises a biconvex glass prism 32 and an aspherical plastic prism 34, which is a concave-convex prism, and the biconvex glass prism 32 is adhered to the aspherical plastic prism 34.

Light that travels through a single spherical prism tends to exhibit a pincushion distortion image. One way to solve such pincushion distortion phenomenon problem is to increase a number of spherical prisms to modify the distortion phenomenon, however, this solution increases the total weight and volume of the lens group 30. As a result, in this embodiment, only a single aspherical prism and a single spherical prism are utilized instead of multiple prisms to form the lens group 30. A proper aspherical prism can improve spherical aberration and promote improved image quality. Furthermore, decreasing the number of prisms can reduce manufacturing cost and meet a HMD 10 requirement of light and small.

In addition, material of prisms affects focus effect. At present, the widely utilized optical prisms are typically made of glass or plastic. The glass prism, in comparison to the plastic prism, has a lower temperature coefficient, a higher transmittance, and a higher melting point. The higher temperature coefficient indicates that molecules of the glass prism are prone to vary (e.g., refraction power and focus length of the prism may change) under high temperature difference environments. However, more time is required to polish the prism and costs are greater resulting in degraded yield and capacity of manufacturing the prisms. Considering the glass prism made of high purity synthetic resin with higher temperature coefficient and lower melting point, these are suitable for mass production by injection molding. In addition, the plastic prism compared to the glass prism, has the feature of lower cost and weight.

The aspherical prism is made of plastic and the spherical prism is made of plastic. A reflectance of the biconvex of the spherical prism is substantially in a range between 1.50 and 1.60. The dispersion power of the biconvex of the spherical prism is substantially in a range between 60 and 65. A conical coefficient of the concave surface of the aspherical plastic prism is in a range between 0 and 1, and a conical coefficient of the convex surface of the aspherical plastic prism is in a range between −0.3 and −500.

Figure 3:
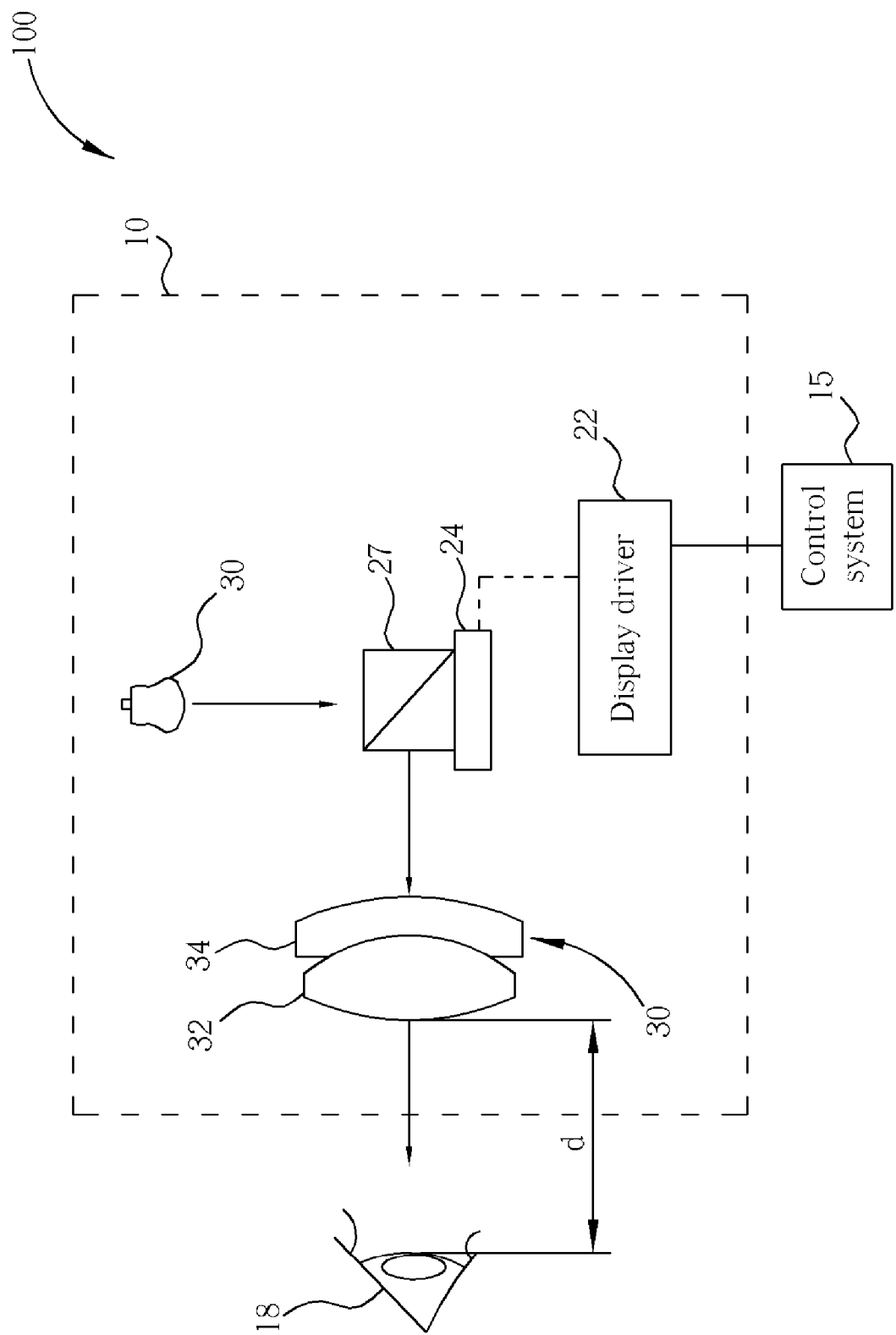
FIG. 3 shows another embodiment according to the present invention.

FIG. 3 shows another embodiment of present invention. Meanwhile, in FIG. 3 a device same as in or equivalent to FIG. 2 will be appending a same symbol. The difference between FIG. 2 and FIG. 3 is arrangement of PBS 27 and the LCOS panel 24. Light emitted from the lamp 20 travels through the PBS 27 and passes through the S-type polarization light to the LCOS panel 24. The LCOS panel 24 modulates the received S-type polarization light into P-type polarization light. The modulated P-type polarization light is reflected by the PBS 27 and is directed by the lens group 30 to the pupil of the user.

In contrast to prior art, the present invention head mounted display has a lens group consisting of a biconvex glass spherical prism and an aspherical plastic prism. An advantage of utilizing the aspherical is to reduce weight. However, the utilization of an aspherical plastic prism makes it possible to simplify the structure, reduce a utilization number of prisms, and reduce the cost, thereby constructing a lightweight HMD. Moreover, the glass prism with high refraction power and low dispersive power in conjunction with an aspherical prism can improve chromatic aberrations and image quality. In addition, an improvement of decentration aberration is obtained by enlarging a diameter of an aspherical prism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display apparatus comprising:
   an image generation device; and
   a lens group consisting of a biconvex spherical prism and an aspherical prism, the lens group being used for focusing a light from the image generation device, wherein the light from the image generation device does not pass through any other lenses before entering the lens group.

2. The display apparatus of claim 1, wherein the biconvex spherical prism is made of glass and the aspherical prism is made of plastic.

3. The display apparatus of claim 1, wherein the aspherical prism is substantially adhered to the biconvex spherical prism.

4. The display apparatus of claim 1, wherein the aspherical prism is a concave-convex prism.

5. The display apparatus of claim 4, wherein a conical coefficient of the concave surface of the aspherical prism is in a range between 0 and 1, and a conical coefficient of the convex surface of the aspherical prism is in a range between −0.3 and −500.

6. The display apparatus of claim 4, wherein a dispersive power of the biconvex spherical prism is substantially in a range between 60 and 65.

7. The display apparatus of claim 1, wherein the image generation device is a liquid crystal on silicon panel (LCOS panel), and the LCOS panel comprising a color filter.

8. The display apparatus of claim 1, further comprising a polarization beam splitter for passing the light from the image generation device to the lens group.

9. The display apparatus of claim 1, further comprising:
   a light source for emitting the light; and
   a polarization beam splitter for directing the light to the image generation device and passing the light reflected from the image generation device to the lens group.

* * * * *